(12) United States Patent
Muniere

(10) Patent No.: US 7,787,884 B2
(45) Date of Patent: Aug. 31, 2010

(54) METHOD FOR OPTIMISING QUALITY OF SERVICE IN THE PACKET-SWITCHED DOMAINN OF A MOBILE COMMUNICATION SYSTEM

(75) Inventor: Vincent Muniere, Meudon (FR)

(73) Assignee: Evolium S.A.S., Paris (FR)

( * ) Notice: Subject to any disclaimer, the term of this patent is extended or adjusted under 35 U.S.C. 154(b) by 209 days.

(21) Appl. No.: 10/753,474

(22) Filed: Jan. 9, 2004

(65) Prior Publication Data
US 2004/0157616 A1    Aug. 12, 2004

(30) Foreign Application Priority Data
Jan. 10, 2003   (EP)   ................... 03290071

(51) Int. Cl.
H04Q 7/20    (2006.01)
(52) U.S. Cl. ................... 455/452.2; 455/575.3
(58) Field of Classification Search .............. 455/422.1, 455/450; 370/329, 349; 375/326
See application file for complete search history.

(56) References Cited

U.S. PATENT DOCUMENTS

| 6,665,280 | B2* | 12/2003 | Forssell et al. ............ 370/329 |
| 2001/0046879 | A1 | 11/2001 | Schramm et al. |
| 2002/0065081 | A1 | 5/2002 | Barany et al. |
| 2002/0114279 | A1 | 8/2002 | Eriksson |
| 2004/0047437 | A1* | 3/2004 | Hamiti et al. ............... 375/326 |
| 2004/0132441 | A1* | 7/2004 | Livet et al. ............... 455/422.1 |
| 2004/0151156 | A1* | 8/2004 | Noel et al. ................... 370/349 |
| 2005/0099990 | A1* | 5/2005 | Uusikartano et al. ........ 370/349 |
| 2005/0215246 | A1* | 9/2005 | Soderbacka et al. ...... 455/426.1 |

FOREIGN PATENT DOCUMENTS
WO    WO 01/20924 A    3/2001

OTHER PUBLICATIONS

"Digital Cellular Telecommunications System; (Phase 2+) (GSM); Universal Mobile Telecommunications System (UMTS); General Packet Radio Service (GPRS); Service description; Stage 2 (3GPP TS 23.060 version 3.6.0 Release 1999)" ETSI TS 123 060 V3.6.0, XX, XX, Jan. 2001, pp. 1-184, XP002198494.

* cited by examiner

Primary Examiner—Lester Kincaid
Assistant Examiner—Phuoc Doan
(74) Attorney, Agent, or Firm—Sughrue Mion, PLLC

(57) ABSTRACT

A method for optimising quality of service in the packet-switched domain of a mobile communication system, a method wherein:
 a core network entity of said system sends to a radio access network entity of said system a request for the setting-up or reconfiguration of a radio bearer for a packet session for a mobile station, said request including first information derived from quality of service information contained in a corresponding request received by said core network entity,
 said core network entity adds to said request second information known at its level and which can be used, together with said first information, to perform a call admission control at the radio level.

29 Claims, 2 Drawing Sheets

FIG_1
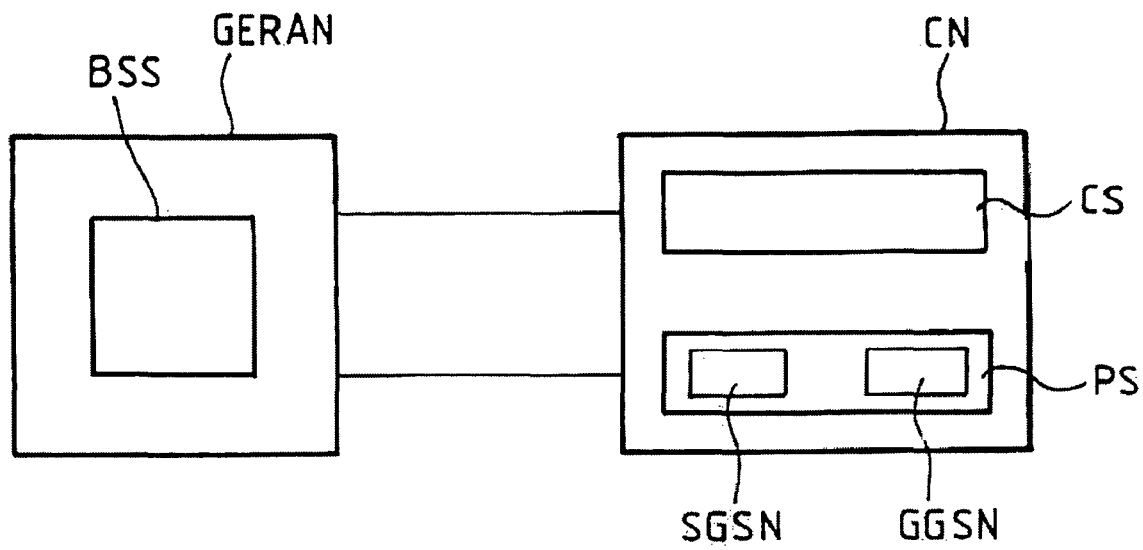
FIG_2
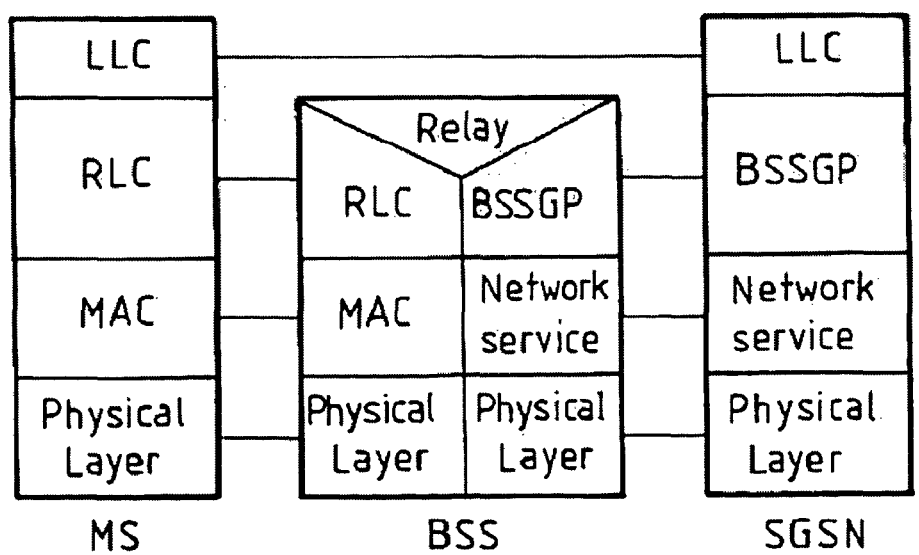

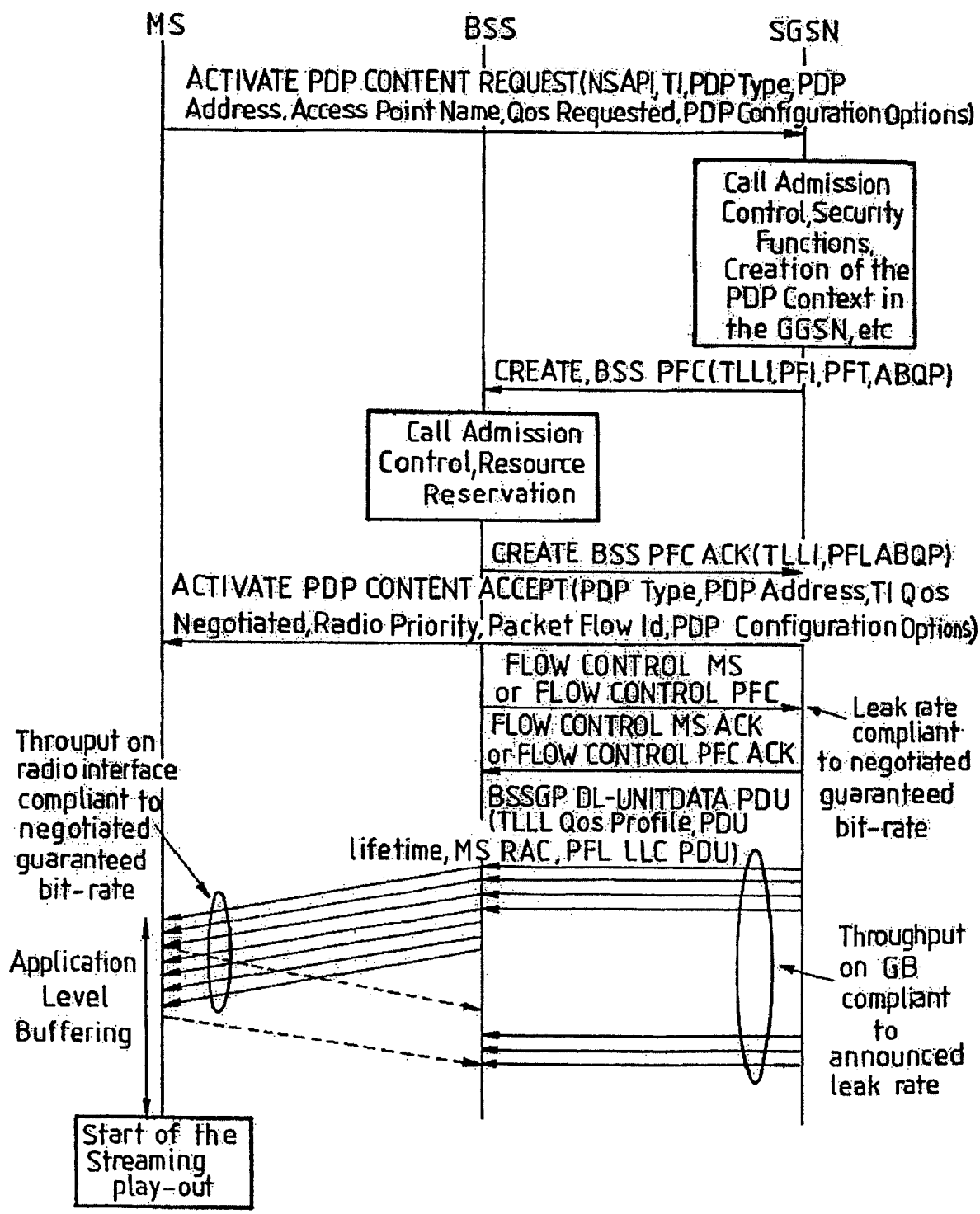

METHOD FOR OPTIMISING QUALITY OF SERVICE IN THE PACKET-SWITCHED DOMAINN OF A MOBILE COMMUNICATION SYSTEM

BACKGROUND OF THE INVENTION

This application is based on and claims the benefit of European Patent Application No. 03 290 071.4 filed Jan. 10, 2003, which is incorporated by reference herein.

The present invention is generally concerned with mobile communication systems.

Mobile communication systems in a general way are subject to standardisation; therefore for a more detailed description of such systems one may refer in particular to the corresponding standards, published by the corresponding standardisation bodies.

Briefly, the general architecture of such systems is divided into a Radio Access Network (RAN), mainly responsible for transmission and management of radio resources on the radio interface between Mobile Stations (MS) and the network, and a Core Network (CN), mainly responsible for switching and management of the communications.

The evolutions of technology in such systems generally lead to a distinction between second generation systems and third generation systems.

A typical example of a second generation system is GSM (<<Global System for Mobile communication>>). The radio access technology used by the GSM RAN is based on multiple access techniques of FDMA/TDMA type (where FDMA stands for <<Frequency Division Multiple Access>> and TDMA stands for <<Time Division Multiple Access>>). The GSM RAN is composed of subsystems called BSS (<<Base Station Subsystems>>) and the GSM CN includes network elements such as MSC (<<Mobile Switching Center>>) and GMSC (<<Gateway Mobile Switching Center>>).

Initially, GSM was mainly intended for providing real-time services such as in particular telephony services, based on circuit-switched technology. GSM has next evolved towards providing non real-time services, such as in particular data transfer services, based on packet-switched technology. This evolution was made possible thanks to the introduction of GPRS (<<General Packet Radio Service>>), including the introduction of two new network elements in the CN, i.e. SGSN (<<Serving GPRS Support Node>>), and GGSN (<<Gateway GPRS Support Node>>). It is recalled that packet-switched technology enables a more efficient use of available resources, by sharing resources at any instant between different users.

A typical example of a third generation system is UMTS (<<Universal Mobile Telecommunication System>>). UMTS offers third generation services, including high bit-rates for both real-time and non real-time services. The radio access technology used by the UMTS RAN is based on multiple access techniques of CDMA type (where CDMA stands for <<Code Division Multiple Access>>). The UMTS RAN is also called UTRAN (<<UMTS Terrestrial Radio Access Network>>) and the UMTS CN includes network elements relating to packet-switched (PS) domain and network elements relating to circuit-switched (CS) domain.

Now, a further evolution of GSM is towards offering third generation services. A first step of this evolution corresponds to the introduction of EDGE (<<Enhanced Data rates for GSM evolution>>) enabling higher bit-rates on the radio interface thanks to the use of modulation techniques of higher spectral efficiency. A second step of this evolution corresponds to the support of packet-based real-time services.

When packet-based technologies are used, the Quality of Service (QoS) becomes an important issue. The QoS architecture in third generation systems is defined in the 3GPP TS 23.107 specification published by 3GPP (<<3rd Generation Partnership Project>>). This QoS architecture relies on different Bearer Services characterized by different QoS attributes including: traffic class, maximum bitrate, guaranteed bitrate, transfer delay, traffic handling priority, . . . etc. Further, a distinction is made between four classes of traffic, respectively:conversational, streaming, interactive, background. Conversational and streaming classes are mainly used for real-time traffic flows, for which the QoS requirements are the highest, in terms of guaranteed bit rate and transfer delay.

The present invention is more particularly concerned with the support of services, in particular real-time services, in the Packet Switched (PS) domain in such systems, in particular when considering GERAN access technology (where GERAN stands for <<GSM/EDGE Radio Access Network>>).

The general architecture of a system using GERAN access technology and packet-switched domain is recalled in FIG. 1.

The protocol architecture when considering GERAN access technology and Packet-Switched (PS) domain is recalled in FIG. 2.

The protocol layers at the radio interface, or interface between MS and BSS, or <<Um>> interface, include:
  a first layer, or physical layer,
  a second layer, or data link layer, in turn divided into different layers: according to increasing levels, MAC (<<Medium Access Control>>), RLC (<<Radio Link Control>>) and LLC (<<Logical Link Control>>, the BSS only being used as a relay function between MS and SGSN, for the LLC layer).

In the same way, the protocol layers at the interface between BSS and SGSN, or <<Gb>> interface, include:
  a first layer, or physical layer,
  a second layer, or data link layer, in turn divided into different layers: according to increasing levels, <<Network service>>, BSSGP (<<BSS GPRS Protocol>>), and LLC (<<Logical Link Control>>, the BSS only being used as a relay function between MS and SGSN, for the LLC layer).

Besides, higher level protocols (not illustrated specifically in this figure) are provided, at application level, or for management tasks such as MM (<<Mobility Management>>), SM (<<Session Management>>), . . . etc.

It is also recalled that frames called LLC frames are formed, in the LLC layer, from data units of higher level. In the LLC frames these data units are called LLC-PDU (<<LLC-Protocol Data Units>>) data units. LLC-PDU data units are then segmented in the RLC/MAC layer, so as to form blocks called RLC data blocks. RLC data blocks are then put in the required format for transmission on the <<Um>> interface, in the physical layer.

It is also recalled that before any data can be transferred for a MS in a packet data session, a PDP (Packet Data Protocol) context must be activated or created for this session, both in the MS and in the SGSN, this PDP context including routing information and QoS information for this session.

Once this PDP context is activated, the MS may transfer data. When a MS effectively has data to transfer during this session, it has to enter a mode (called Packet Transfer Mode) where there is a TBF (Temporary Block Flow) established for this MS, i.e where this MS is allocated radio resource on one or more PDCH (Packet Data Channel) for the transfer of LLC PDUs. Otherwise, when the MS has no data to transfer, it is in a mode (called Packet Idle Mode) where it is not allocated any resource on a PDCH.

The process by which a MS is allocated radio resource on one or more PDCHs is called TBF establishment. Briefly recalled, this process may be either in a one-phase access or in a two-phase access. In either case the MS sends a Packet Channel Request to the network. In one-phase access, the network responds by reserving radio resources for data transfer for this MS. In two-phase access, the network first responds by reserving radio resources for the MS to transmit a more detailed description of its needs, and thereafter reserves radio resources for the data transfer for this MS.

As recalled above, higher data rates can now be achieved thanks to the GPRS enhancement corresponding to EDGE, also called EGPRS (Enhanced GPRS). Another way of achieving higher data rates is via multislot operation, whereby a MS can be simultaneously allocated more than one PDCH. However such ways of achieving higher data rates are generally not supported by all MSs and/or all cells of the network. Therefore, in order for the network to act efficiently, some mechanisms are required, by which the network can get a knowledge of the radio access capabilities of a MS, including in particular its capability of operating in EGPRS mode, and/or its multislot class (or number of timeslots on which the MS can operate simultaneously).

It is also recalled that before requiring any activation of a PDP context, a MS has to perform a GPRS Attach procedure, by which it provides the network with its identity as well as other parameters, mainly for a purpose of checking whether the user is authorised to have access to GPRS services, depending on his subscription. Among those parameters, the MS provides its radio access capabilities.

A typical transaction where the network has to get a knowledge of the MS radio access capabilities is the TBF establishment procedure. As this transaction is between the MS and the BSS, specific mechanisms have been provided to enable the BSS to get a knowledge of the MS radio acces capabilities, such mechanisms in particular providing that a different request message is sent by the MS depending on whether it supports EGPRS or not (EGPRS Packet Channel Request message if the MS supports EGPRS, or (Packet) Channel Request message if the MS does not support EGPRS, the latter message depending on whether PBCCH (Packet Broadcast Control Channel) is present in the cell or not), or that the MS multislot class is indicated in the request message sent by the MS.

Turning back to the QoS architecture required for supporting third generation services in a system such as the one recalled at FIG. 1 (including the support of high bitrates for real-time services in the packet-switched domain), it is recalled that the setting-up of a bearer in such a system is generally performed in a way as to guarantee that the QoS requirements are fulfilled at different levels of the system, taking into account the different characteristics of each level. The different bearers on which the QoS architecture relies include in particular a radio bearer, and the QoS requirements have to be fulfilled at the radio level.

Therefore, when considering GERAN access technology, the support of services such as in particular real-time services, in the Packet Switched domain requires several basic functions:

support of Rel-99 GERAN standards in the MS, BSS, and SGSN, support of Rel-99 QoS parameter negotiation at PDP context activation time, including a negotiation with the BSS (in Rel-97, the QoS parameters are negotiated only between the MS and the SGSN). This negotiation between the BSS and the SGSN requires the support of the Packet Flow Context feature on the Gb interface (defined in 3GPP TS 08.18), support of specific Call Admission Control algorithms in the BSS and the SGSN in order to guarantee real-time constraints such as transfer delay and bitrate, which requires the reservation of resources at the time of a bearer set-up.

FIG. 4 shows an overview of the various steps involved in setting-up a bearer such as for example a real-time bearer.

1) The R99 MS requests the activation of a PDP context, for which the "QoS Requested" parameters correspond to a real-time bearer.

2) The SGSN may then perform security and trace functions. A Call Admission Control algorithm is called to check whether the required QoS attributes can be fulfilled. The SGSN may then restrict the requested QoS attributes given its capabilities and the current load, and it shall restrict the requested QoS attributes according to the subscribed QoS profile. The SGSN then requests the creation of the PDP context in the GGSN.

3) Various functions are performed in the GGSN, which may even reject the request from the SGSN if the QoS Negotiated received from the SGSN is incompatible with the PDP context being activated.

4) Once the creation of the PDP context in the GGSN has been confirmed as successful, the SGSN then requests the creation of a Packet Flow Context (PFC) for the real-time bearer. Although it is possible in theory to aggregate several bearers into the same PFC, it seems better to create one PFC for each real-time bearer and aggregate only non real-time bearers having similar QoS characteristics within the same PFC. The request from the SGSN contains several mandatory parameters:

TLLI: identifier of the Mobile Station

PFI: Packet Flow Identifier (identifier of the PFC)

PFT: Packet Flow Timer (lifetime of the PFC during periods of inactivity)

ABQP: Aggregate BSS QoS Profile (QoS parameters characterising the PFC)

5) The BSS then performs a Call Admission Control algorithm to check whether the requested QoS attributes can be fulfilled. Several functions may be performed in order to be able to support the requested QoS (e.g. reallocation of other MSs, redirection of the MS to another less loaded cell, etc). The BSS may restrict the requested aggregate BSS QoS profile given its capabilities and the current load, although not fulfilling the guaranteed bitrate and the transfer delay attributes should as far as possible be avoided. The BSS performs resource reservation in order to support the negotiated guaranteed bitrate and transfer delay, taking into account the RLC mode that will be used for the flow (quite likely: RLC acknowledged mode since LLC PDUs should be rather large: 500 octets or more for video streaming for instance). The resources reserved on the radio interface need to be higher than the negotiated guaranteed bitrate due to radio interface overheads.

6) The BSS acknowledges the PFC creation if it is successful, providing to the SGSN the negotiated ABQP, i.e. the negotiated Quality of Service attributes.

7) Assuming that the negotiated ABQP is acceptable for the SGSN, the PDP context activation procedure is completed by the sending of an acceptance message to the Mobile Station.

8) Because the SGSN will have to comply with the announced leak rate for the corresponding MS/PFC, it is quite likely that the BSS has to send a FLOW CONTROL MS or FLOW CONTROL PFC message to the SGSN in order to announce a leakrate that is greater than the negotiated guaranteed bitrate (otherwise default values are used). The choice between MS and PFC flow control is implementation dependent and depends also on whether there are other active PFCs for the same MS.

9) The SGSN acknowledges the FLOW CONTROL MS or FLOW CONTROL PFC message.

10) When the real-time session is started (case of downlink flow in this example) thanks to other upper layer protocols not described in this document, the SGSN sends to the BSS, BSSGP PDUs containing the PDU lifetime, the QoS profile (R97, not useful in this case), the MS Radio Access Capabilities, the PFI and the LLC PDU to be sent.

11) The BSS sends the LLC PDUs to the MS.

SUMMARY OF THE INVENTION

In this context, the present invention is based in particular on the following observations.

From the description above, it appears that an important step in supporting real-time services is the call admission control algorithm both in the SGSN and in the BSS, which requires the knowledge of:

the cell in which the MS is, and its capabilities (e.g. if it is EGPRS capable or not);

the cell state (e.g. how loaded it is);

the MS capabilities (e.g. if the MS is EGPRS capable or not, and the MS's multislot class).

Indeed, if the PDP context requires a guaranteed bitrate that cannot be supported in GPRS mode by a multislot class 1 MS, then the BSS needs to know whether the MS is EGPRS capable or not and what is its multislot class; also the BSS needs to know whether the cell in which the PFC would be used is EGPRS capable or not and what are the remaining radio resources.

For example, considering the case where the PDP context requires a downlink guaranteed bitrate of 64 kbps for an MS that is located:

in an EGPRS capable cell that has plenty of resources available, the following cases may be considered for example:

case 1: if the MS is GPRS capable-only and is multislot class 4, the maximum theoretical throughput that can be offered on the radio in downlink is: $3*20$ kbps=60 kbps. In this case, the requested guaranteed bitrate cannot be served.

case 2: if the MS is EGPRS capable and is multislot class 8, the maximum theoretical throughput that can be offered on the radio in downlink is: $4*59.2$ kbps=236.8 kbps. In this case, the requested guaranteed bitrate can be served.

in a GPRS capable cell only, that has plenty of resources available, the following case may be considered for example:

case 3: whatever the MS's EGPRS capability, only the GPRS multislot class shall be considered. If the MS is GPRS multislot class 8, then the maximum theoretical throughput that can be offered in the downlink is: $4*20$ kbps=80 kbps. However, the BSS knows that because of the radio conditions, only $4*15$ kbps=60 kbps can be obtained. In this case, the requested guaranteed bitrate cannot be served Therefore it can be seen that depending on the MS characteristics and the cell characteristics, the BSS will answer differently to the SGSN request.

In this context, the present invention recognises some problems with the state of the art, which may be presented as follows.

In the SGSN all characteristics of the Mobile Station are known since the MS has previously performed a GPRS Attach procedure. Further, the SGSN does not know the cell radio characteristics and should not decode MS radio characteristics such as EGPRS capability and multislot class. Therefore it will likely implement a very simple CAC based only on its current load and maybe considering the maximum theoretical throughput that can be served by GERAN (which is $8*59.2=473.6$ kbps).

In the BSS, there are two options:

either the MS for which the real-time PFC is requested is already in Packet Transfer Mode (i.e. there is a TBF established for that MS for another, on-going session). In this case, everything needed for the CAC (Call Admission Control) is typically known in the BSS: the MS's serving cell, its EGPRS capability and its multislot class. There are some cases though in which the MS's multislot class is not known (e.g. there is only an uplink EGPRS TBF (UL EGPRS TBF) on-going established following the receipt of an EGPRS PACKET CHANNEL REQUEST with cause 'signalling').

or the MS is not in packet transfer mode. In this case, if the MS was in Packet Transfer Mode a few seconds ago (i.e. the MS is still in the Ready state) and the BSS has stored the MS Radio Access Capabilities from the last GPRS session, the MS Radio Access Capabilities can be known. Since the CREATE BSS PFC message is sent on a BVCI (BSSGP Virtual Connection identifier) corresponding to the cell in which the MS is located, then the BSS has everything it needs. However, the storing of MS Radio Access Capabilities following a GRPS session is not a standardised procedure and furthermore the availability of the MS Radio Access Capabilities cannot always be guaranteed (e.g. the GPRS session only consisted of an uplink TBF created through a one-phase access procedure; in this case the MS Radio Access Capabilities are not made known to the BSS).

Therefore, today it cannot be ensured that the BSS knows the MS's EGPRS capability and its multislot class at the time it receives a CREATE BSS PFC message.

As also realized by the present invention, a solution could be to use a standardised procedure which allows the BSS to retrieve the MS Radio Access Capabilities from the SGSN: it is called the RA CAPABILITY UPDATE procedure. This procedure could be called by the BSS when it receives a CREATE BSS PFC message for a MS which it does not know.

However, as further realised by the present invention, this procedure would add some delay in the real-time bearer set-up time, which is a very time-critical procedure since the end-user experience depends on that set-up time. Also, in practice it may not be guaranteed that all SGSNs have implemented this procedure, i.e. it may be impossible to use this procedure.

In other words, today the mechanisms by which the network can get a knowledge of the radio access capabilities of a MS at the time of the creation (or modification) of a Packet Flow Context are not fully optimised, and therefore the QoS requirements may not be fulfilled, or the overall system performance may be degraded.

The present invention in particular enables to solve part or all of the above-recognized problems. More generally, the present invention enables to optimise the support of services such as in particular real-time services in the packet-switched domain of such systems.

An object of the present invention is a method for optimising quality of service in the packet-switched domain of a mobile communication system, a method wherein:

- a core network entity of said system sends to a radio access network entity of said system a request for the setting-up or reconfiguration of a radio bearer for a packet session for a mobile station, said request including first information derived from quality of service information contained in a corresponding request received by said core network entity,
- said core network entity adds to said request second information known at its level and which can be used, together with said first information, to perform a call admission control at the radio level.

According to another object, said second information include information representative of radio access capabilities of said mobile station.

According to another object, said radio access capabilities include capabilities to support higher data rates.

According to another object, said capabilities to support higher data rates include a multislot capability.

According to another object, said capabilities to support higher data rates include a capability to support different data transfer modes.

According to another object, said different data transfer modes include the GPRS (<<General Packet Radio Service>>) mode and the EGPRS (<<Enhanced General Packet Radio Service>>) mode.

According to another object, said setting-up or reconfiguration of a radio bearer includes the creation or modification of a Packet Flow Context.

According to another object, said request for the setting-up or reconfiguration of a radio bearer is sent in a CREATE BSS PFC message.

Another object of the present invention is a Core Network entity in the Packet-Switched domain (SGSN) for performing a method according to the present invention.

Another object of the present invention is a Radio Access Network entity (BSS) for performing a method according to the present invention.

BRIEF DESCRIPTION OF THE DRAWINGS

These and other objects of the present invention will become more apparent from the following description taken in conjunction with the accompanying drawings:

FIG. 1 is a diagram intended to recall the general architecture of a system using GERAN access technology and packet-switched domain, FIG. 2 is a diagram intended to recall the protocol architecture in a system using GERAN access technology and Packet-Switched (PS) domain, FIG. 3 is a diagram intended to recall the different steps involved in the setting-up of a bearer such as a real-time bearer in such a system.

DETAILED DESCRIPTION OF THE DRAWINGS

The present invention may also be explained as follows, for example when considering GERAN access technolgy and PS domain, as recalled above.

The present invention in particular proposes to add to the CREATE-BSS-PFC message as defined in 3GPP TS 08.18 and 3GPP TS 48.018 specifications, allowing the BSS to create or modify a BSS Packet Flow Context, information representative of the radio access capabilities of the MS.

Information representative of the radio access capabilities of a MS may include, in particular, its multislot capability, and/or its capability to support the EGPRS mode.

More generally the present invention proposes a method for optimising quality of service in the packet-switched domain of a mobile communication system, a method wherein:

- a core network entity of said system sends to a radio access network entity of said system a request for the setting-up or reconfiguration of a radio bearer for a packet session for a mobile station, said request including first information derived from quality of service information contained in a corresponding request received by said core network entity,
- said core network entity adds to said request second information known at its level and which can be used, together with said first information, to perform a call admission control at the radio level.

In particular:

- the mobile communication system may be in particular a GSM/EDGE system,
- the radio access network may be a GSM/EDGE BSS
- said second second information may be for performing CAC (Call Admission control) of a real-time bearer and may be the MS's Radio Access Capabilities
- said setting-up or reconfiguration of a radio bearer may include the creation or modification of a Packet Flow Context,
- said request for the setting-up or reconfiguration of a radio bearer may be sent in a CREATE BSS PFC message,
- said method may be for the PFC creation procedure initiated by the SGSN at the time of the PDP context activation for a real-time bearer.

The present invention also has for its object a network element (SGSN) for a core network of a mobile communication system, comprising means for performing a method according to any of the above described methods.

Said means may comprise:

- means for sending to a radio access network entity of said system a request for the setting-up or reconfiguration of a radio bearer for a packet session for a mobile station, said request including first information derived from quality of service information contained in a corresponding request received by said core network entity,
- means for adding to said request second information known at its level and which can be used, together with said first information, to perform a call admission control at the radio level.

The present invention also has for its object a network element for a radio access network (BSS) of a mobile communication system, comprising means for performing a method according to any of the above described methods.

Said means may comprise:

- means for receiving from a core network entity of said system a request for the setting-up or reconfiguration of a radio bearer for a packet session for a mobile station, said request including first information derived from quality of service information contained in a corresponding request received by said core network entity, said request further including second information known at the level of said core network entity and which can be used, together with said first information, to perform a call admission control at the radio level.

The detailed implementation of such means does not raise any special problem for a person skilled in the art, and therefore such means do not need to be more fully disclosed than has been made above, by their function, for a person skilled in the art.

The invention claimed is:

1. A method for optimizing quality of service in a packet-switched domain of a mobile communication system, the method comprising:
    sending, by a core network entity of said system, to a radio access network entity of said system a request for the setting-up or reconfiguration of a radio bearer for a packet session for a mobile station, said request comprising first information derived from quality of service information contained in a corresponding request received by said core network entity; and
    adding, by said core network entity, to said request second information, that is known at a level of said core network entity and which is used, together with said first information, to perform a call admission control at the radio level.

2. A method according to claim 1, wherein said second information comprise information representative of radio access capabilities of said mobile station.

3. A method according to claim 2, wherein said radio access capabilities comprise capabilities to support higher data rates.

4. A method according to claim 3, wherein said capabilities to support higher data rates comprise a multislot capability.

5. A method according to claim 3, wherein said capabilities to support higher data rates comprise a capability to support different data transfer modes.

6. A method according to claim 5, wherein said different data transfer modes comprise a General Packet Radio Service (GPRS) mode and an Enhanced General Packet Radio Service (EGPRS) mode.

7. A method according to claim 1, wherein said setting-up or reconfiguration of a radio bearer comprises the creation or modification of a Packet Flow Context.

8. A method according to claim 7, wherein said request for the setting-up or the reconfiguration of a corresponding radio bearer is sent in a CREATE BSS PFC message.

9. The method according to claim 1, further comprising performing a call admission control at the radio level based on said first information together with said second information.

10. The method according to claim 1, wherein the request is a request for setting-up the radio bearer for a new packet session for the mobile station.

11. The method according to claim 1, wherein the request for the setting-up or the reconfiguration of a corresponding radio bearer is sent in a CREATE BSS PFC message.

12. A network element for a core network entity (SGSN) of a mobile communication system, comprising:
    means for sending to a radio access network entity of said system a request for the setting-up or reconfiguration of a radio bearer for a packet session for a mobile station, said request comprising first information derived from quality of service information contained in a corresponding request received by said core network entity; and
    means for adding to said request second information, that is known at a level of said core network entity and which is used, together with said first information, to perform a call admission control at the radio level.

13. The network element according to claim 12, further comprising means for performing a call admission control at the radio level based on said first information together with said second information.

14. The network element according to claim 12, wherein said second information comprise information representative of radio access capabilities of said mobile station.

15. The network element according to claim 14, wherein said radio access capabilities comprise capabilities to support higher data rates.

16. The network element according to claim 15, wherein said capabilities to support higher data rates comprise a multislot capability.

17. The network element according to claim 15, wherein said capabilities to support higher data rates comprise a capability to support different data transfer modes.

18. The network element according to claim 17, wherein said different data transfer modes comprise a General Packet Radio Service (GPRS) mode and an Enhanced General Packet Radio Service (EGPRS) mode.

19. The network element according to claim 12, wherein said setting-up or reconfiguration of a radio bearer comprises the creation or modification of a Packet Flow Context.

20. The network element according to claim 19, wherein said request for the setting-up or the reconfiguration of a corresponding radio bearer is sent in a CREATE BSS PFC message.

21. A network element of a Radio Access Network entity (BSS) of a mobile communication system comprising:
    a receiving module receiving from a core network entity of said system a request for the setting-up or reconfiguration of a radio bearer for a packet session for a mobile station, said request comprising first information derived from quality of service information contained in a corresponding request received by said core network entity and second information, known at a level of said core network entity and which is used, together with said first information, to perform a call admission control at the radio level.

22. The network element according to claim 21, wherein said second information comprises information representative of radio access capabilities of said mobile station.

23. The network element according to claim 22, wherein said radio access capabilities comprise capabilities to support higher data rates.

24. The network element according to claim 23, wherein said capabilities to support higher data rates comprise a multislot capability.

25. The network element according to claim 23, wherein said capabilities to support higher data rates comprise a capability to support different data transfer modes.

26. The network element according to claim 25, wherein said different data transfer modes comprise a General Packet Radio Service (GPRS) mode and an Enhanced General Packet Radio Service (EGPRS) mode.

27. The network element according to claim 21, wherein said setting-up or reconfiguration of a radio bearer comprises the creation or modification of a Packet Flow Context.

28. The network element according to claim 27, wherein said request for the setting-up or the reconfiguration of a corresponding radio bearer is sent in a CREATE BSS PFC message.

29. The network element according to claim 21 further comprising means for performing a call admission control at the radio level based on said first information together with said second information.

* * * * *